United States Patent [19]

Wandel

[11] 4,106,473

[45] Aug. 15, 1978

[54] GRILLING DEVICE WITH WARMING CHAMBER

[75] Inventor: Stephan H. A. Wandel, Bremen, Fed. Rep. of Germany

[73] Assignee: EWG Import-und Export-Gesellschaft mit beschrankter Haftung, Bremen, Fed. Rep. of Germany

[21] Appl. No.: 780,696

[22] Filed: Mar. 24, 1977

[30] Foreign Application Priority Data

Jan. 15, 1977 [DE] Fed. Rep. of Germany ....... 2701552

[51] Int. Cl.² .............................................. A47J 37/00
[52] U.S. Cl. .................................... 126/25 R; 99/339; 99/340; 99/446; 99/421 HV
[58] Field of Search ............... 126/25 R; 99/339, 340, 99/344, 345, 346

[56] References Cited

U.S. PATENT DOCUMENTS

| 2,334,847 | 11/1943 | Spiers | 126/25 R X |
| 3,019,720 | 2/1962 | Topper | 99/339 |
| 3,182,585 | 5/1965 | Rensch | 126/25 R X |
| 3,230,948 | 1/1966 | Schmitt | 99/340 X |
| 3,296,955 | 1/1967 | Schaniel | 126/25 R X |
| 3,503,324 | 3/1970 | Gmeiner | 126/25 R X |
| 3,809,051 | 5/1974 | Giroux | 126/25 R X |
| 3,899,961 | 8/1975 | Tauguy | 99/340 |

Primary Examiner—Harold W. Weakley
Attorney, Agent, or Firm—Wood, Herron & Evans

[57] ABSTRACT

A grill device is disclosed comprising a firebox including sides and a grid extending between the sides. Two side walls extend above the firebox and support a rotatable spit. A grease-drip pan extends upwardly from the back of the firebox between the side walls. Legs are fastened to opposite sides of the firebox. A warming chamber is positioned beneath the firebox and is adapted to receive one or more flat plates having raised peripheral walls and a handle. Auxiliary warming chambers are provided on the rear surface of the grease-drip pan. The firebox can be secured in either a horizontal plane or in a vertical plane by means of cradles carried by the legs. Each of the cradles includes a downwardly-extending opening and two stops which cooperate with a stub-shaft and transverse arm carried by the firebox.

12 Claims, 10 Drawing Figures

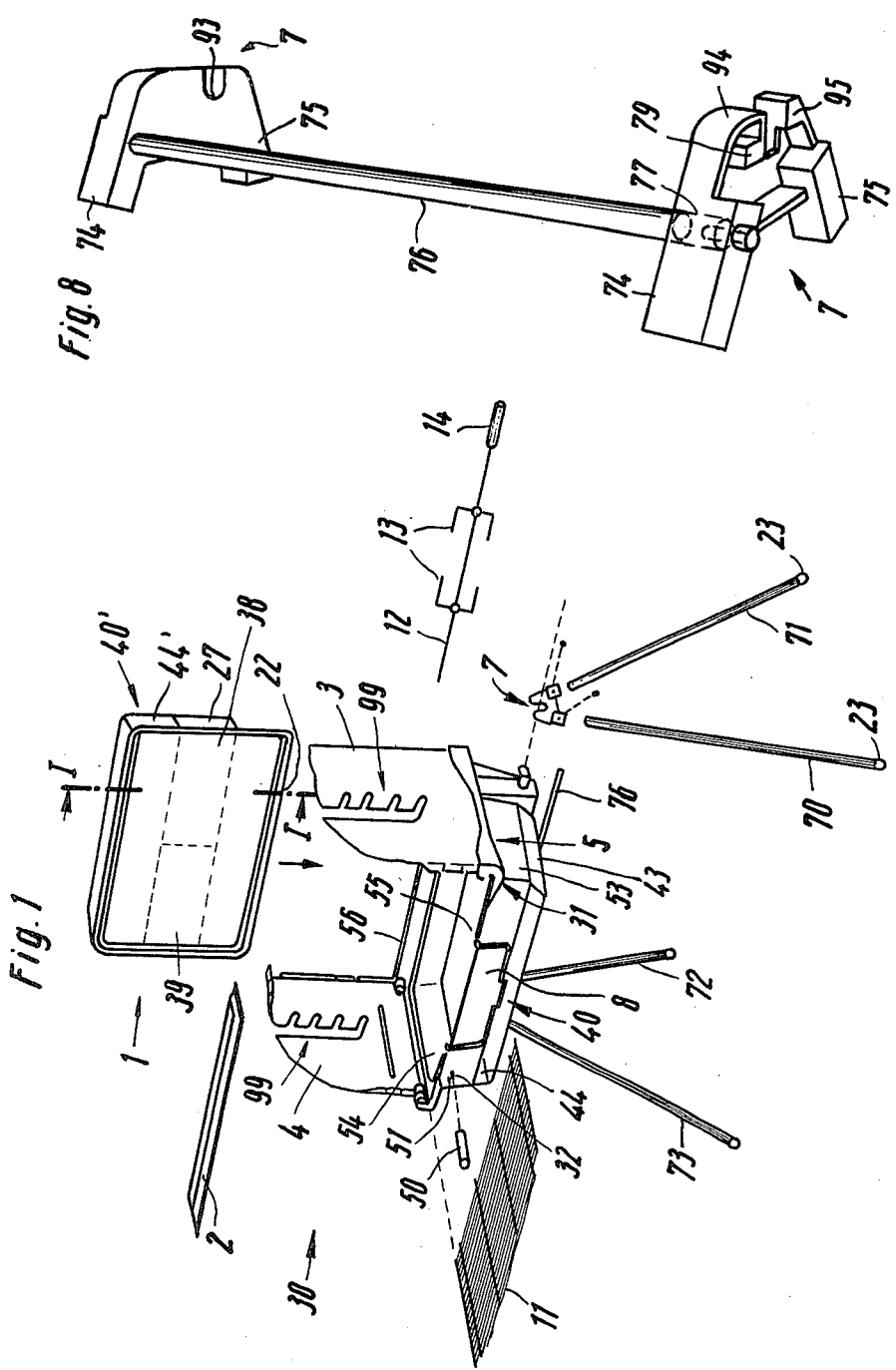

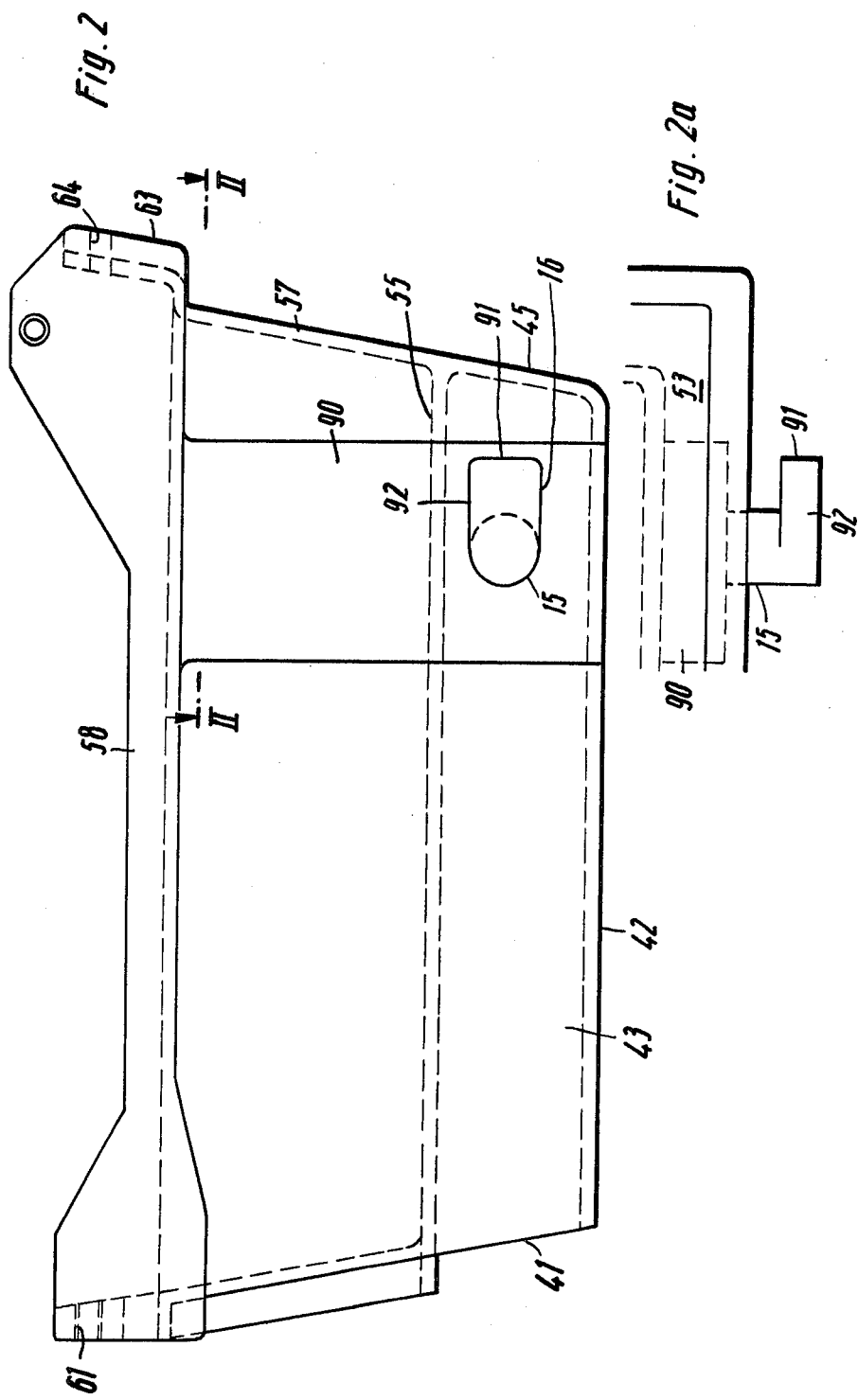

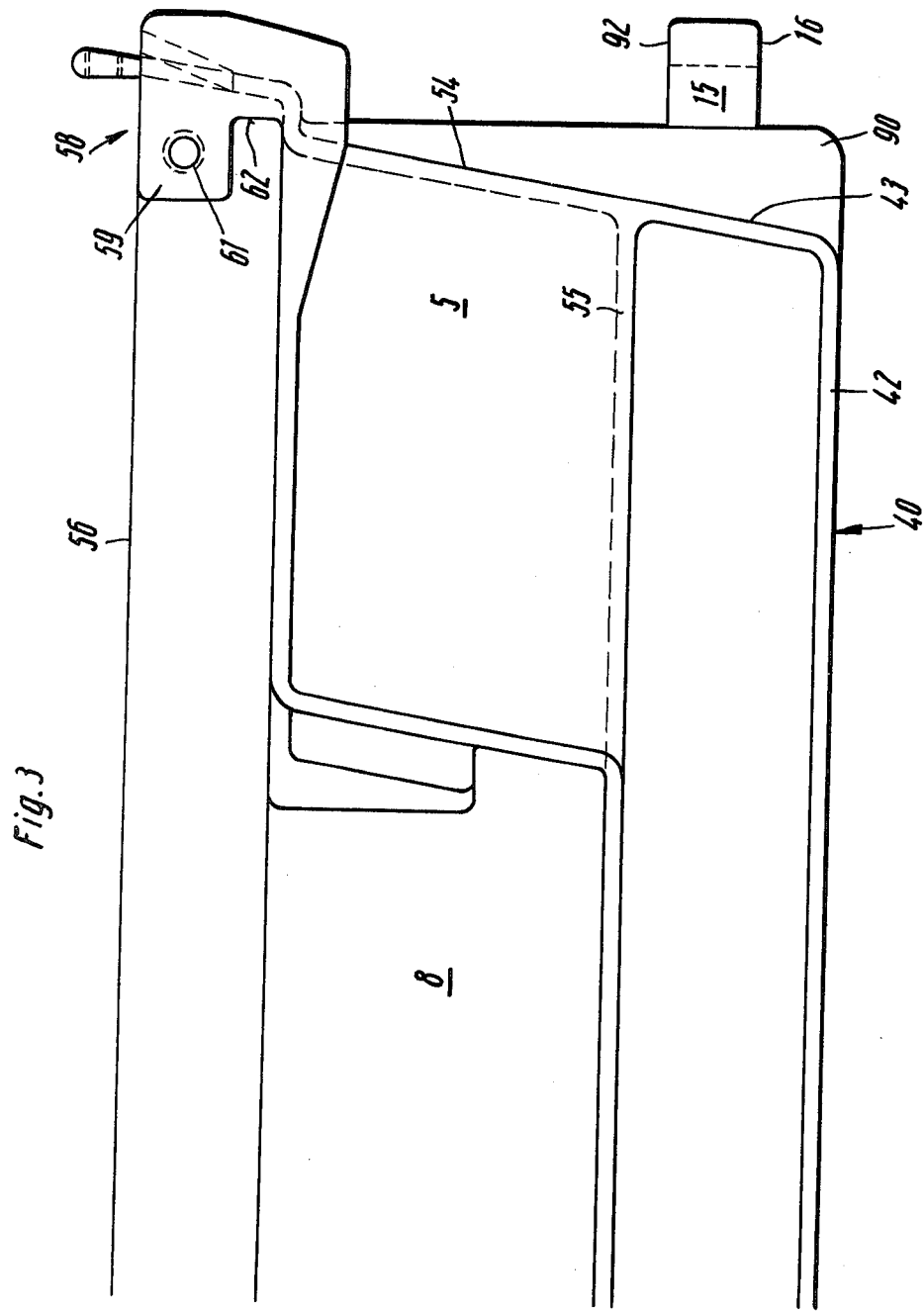

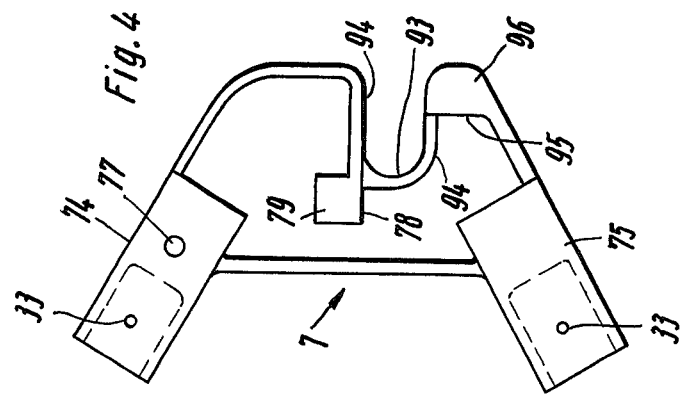

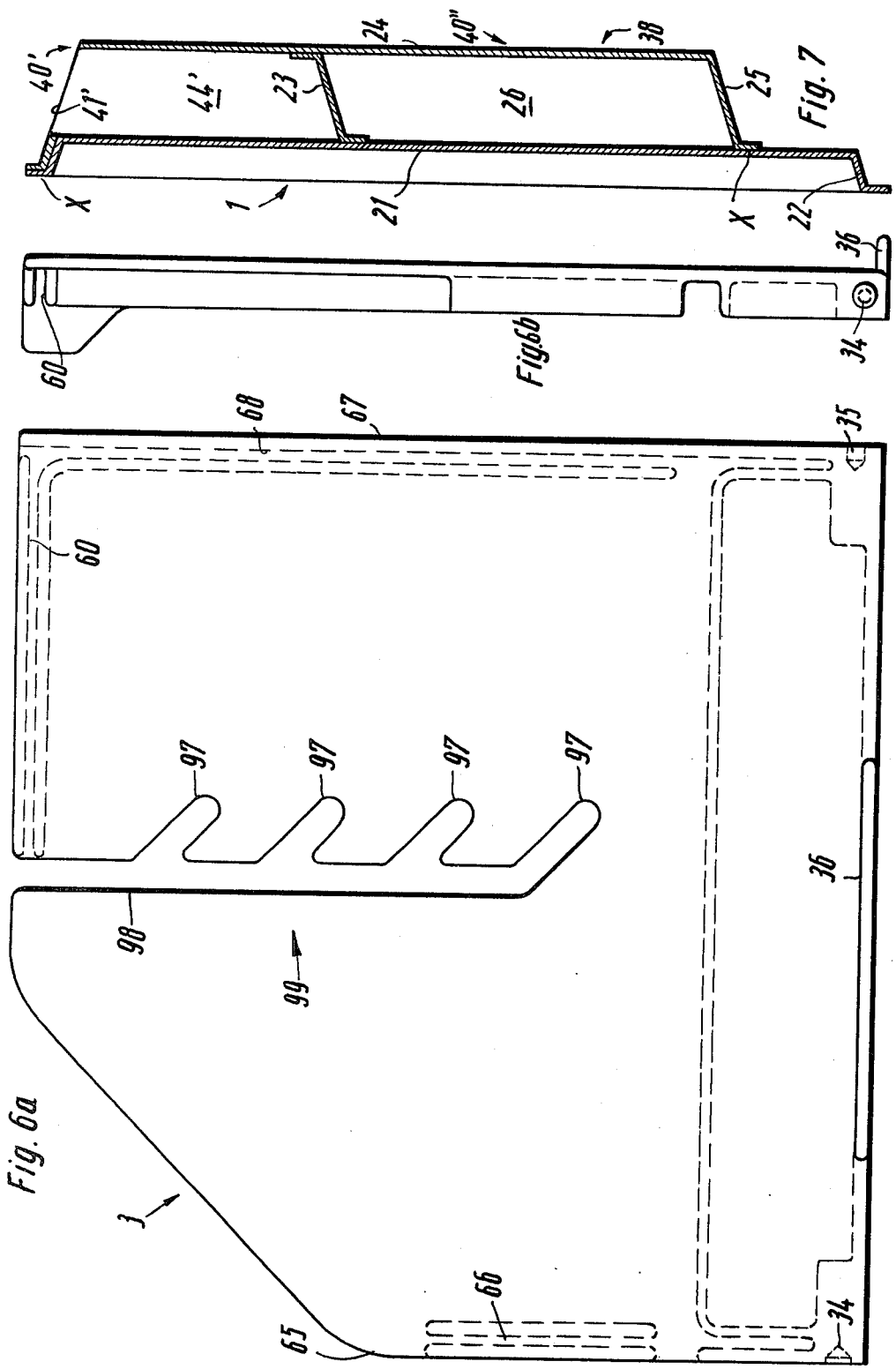

GRILLING DEVICE WITH WARMING CHAMBER

BACKGROUND OF THE INVENTION

The invention concerns a grill device with a firebox, which extends upward on two opposite sides of two sidewalls, which are equipped with a holding device for the support of a spit bar which is mounted between the sidewalls. A grease-drip pan is fastened to the back of the firebox and extends between the rear vertical edges of the side walls. Legs are fastened to opposite sides of the firebox, and a grid can be placed between the holding device and an upper opening of the firebox.

Grills of this type have found widespread usage over the past years, especially within the realm of private use. Portable in form, they serve for the grilling of poultry or the roasting of sausages, shashliks and the like. The grill is ideal for setup in the garden where it becomes the culinary center of the garden party. When the sidewalls, the grease-drip pan, the readily available hood sections as well as the legs and grid are removed from the firebox, the grill fits easily into any automobile trunk and is therefore an ideal piece of cooking equipment for camping trips.

The ease in portability of the grill limits its size, especially in reference to the useful cooking area of the grid. When serving a large party of guests with bratwurst, shashliks or the like, an undesirable characteristic of the grill becomes evident when, due to the lack of sufficient grilling space, not all of the guests can be offered a sausage at the same time. Consequently, some of the guests must wait.

Prior art grills have yet a drawback in another respect. When chicken, for example, must be grilled to a well-done stage, melted fat begins to drip into the hot coals, causing abrupt flaming which chars the flesh. For this reason, the firebox together with the attached grease-catch pan can be tilted vertically over the base of the grill, which lets the grease drip into the grease-catch pan and allows the chicken to continue cooking from the side. To tilt the firebox it is necessary to loosen certain stop-screws on the pivot joint by which the legs are attached to the firebox. Since the pivot joint is directly connected to the firebox, its temperature becomes so great that the unprotected hand can be burned while loosening the screws. Since the entire grill becomes hot, it is rather difficult to maneuver the firebox into the desired position.

One object of the present invention is to provide an improved grill that enables the simultaneous serving of a greater number of sausages, shashliks and the like.

A second object is to provide an improved grill which also can be more easily maneuvered into the desired position without the necessity of directly touching the hot grill parts.

The present invention is predicated in part upon the concept of providing a grill including a warming chamber featuring at least one flat-plate opening, enclosed on at least two sides, for the heating and continued warming of at least one heat-conducting flat-plate. This enables the already cooked sausages on the flat-plate to be kept at increased temperatures until all the sausages are ready for serving.

A second important feature of the present invention is a construction which provides greater ease in the maneuvering of the grill. In accordance with the present invention, the firebox is provided on each of its sides with a pivot which allows the firebox to be swiveled on an axis parallel to the base of the grill between a first position, in which the base of the firebox is essentially parallel with the base of the grill, and a second position, in which the base of the firebox is essentially vertical to the base of the grill. The pivot joint consists of a stub-shaft extending outwardly from the firebox and including a lateral stop-arm. The grill legs carry a cradle into which fits the diameter of the shaft. The cradle is provided with at least one stop-face for the engagement with the stop-arm.

These and other objects and advantages of the present invention will be more readily apparent from a consideration of the following detailed description of the drawings illustrating a preferred embodiment of the grill.

DESCRIPTION OF THE DRAWINGS

FIG. 1 is a schematic representation of the grill's individual components displayed in an exploded view;

FIG. 2 is a side view of the grill's firebox;

FIG. 2a is a cross-section of the firebox taken along the line II—II in FIG. 2;

FIG. 3 is a front view of the firebox divided at midpoint by a vertical line;

FIG. 4 is an outside view in the direction of the tilt-axis of the cradle housing, which is connected to the grill's firebox;

FIG. 5a is a top view of a flat-plate for use in the grill;

FIG. 5b is a cross-section taken along the line V—V of FIG. 5a through the flat-plate;

FIG. 6a is a side view of a side wall of the grill;

FIG. 6b is a front view of a side wall of the grill;

FIG. 7 is a cross-sectional along the line I—I of FIG. 1 through the grease-catch pan; and FIG. 8 is a perspective representation of both cradle housings connected by the tie rod in enlarged scale.

FIGS. 1 through 8 depict a preferred form of a portable, collapsible garden grill in which meat can be grilled on the spit bar 12 and with which sausages, shashliks and the like can be roasted on the grid 11.

The grill 30 comprises a firebox 5 of essentially rectangular shape with a damper 8 attached to its front side 51. The side walls 3, 4 are attached to the facing narrow walls 53 and 54 of the firebox in such a way that the bottom edge of each side wall corresponds to the upper edge of each of the narrow walls 53 and 54, which hold the side walls 3, 4 at a perpendicular angle to the floor 55 of the firebox. The grid 11 is placed over the upper opening of firebox 5 parallel to the floor 55 of the firebox.

A flat grease-drip pan 1, having a length nearly equal to the width of the firebox 5 and a width nearly equal to the height of the side wall 3, can be inserted between the rear edges of both side walls 3, 4 so that the wide edge 22 of the grease-drip pan 1 fits into the top ridge 56 on the rear wall 57 of the firebox 5.

The grill 30 can also be enclosed from the top by a cover 2 which fits into grooves (designated by 60 in FIG. 6) which are provided along the upper edge of each side wall 3, 4 and covers the space between the walls 3, 4. Two of the four legs 70, 71, 72 and 73 of the grill 30 are each inserted into sockets 74, 75 on the cradle housing 7 and fastened. The cradle housings 7 are fastened to the narrow sides 53, 54 of the firebox 5, to be described later, and are connected to each other by means of a tie rod 76 which is attached to the firebox 5.

The spit bar 12 is held by notches 99 on each of the side walls 3, 4. The holding device consists of a cut 98 which extends downwardly from the upper edge of each side wall 3, 4 toward the bottom edge of the wall 3, 4 and from which extends smaller notches 97 that are spaced parallel to each other for the support of the spit bar 12.

Under the floor 55 of the firebox 5 is attached a warming chamber, designated by 40, and forms with the firebox 5 a one-piece unit, manufactured, for example, from cast iron or light die-cast metal. The length and breadth of the warming chamber are nearly equal to the dimensions of the floor 55. The warming chamber 40 is connected to the firebox 5 by means of sidewalls 43, 44 and a back wall 45 (see FIG. 2) which correspond to the side walls 53, 54 and the back wall 57 of the firebox 5, thereby creating an enclosed area between the side walls 43, 44, the back wall 45, the warming chamber floor 42 and the firebox floor 55, which runs parallel to the warming chamber floor 42. On the front, the warming chamber 40 has an opening 41 for the insertion of flat plates 80 which extend across the entire width and breadth of the warming chamber 40.

The width of the flat plate opening is determined to allow for the insertion of, for example, five flat plates 80, and the height should allow for the insertion of flatplates which are filled with sausages, shashliks or pieces of meat.

As can be seen in FIGS. 2 and 3, the union of the warming chamber 40 and the fire box 5, where the side walls 43, 44 and the back wall 45 of the warming chamber 40 meet with the corresponding side walls 53, 54 and the back wall 57 of the fire box 5, is barely noticeable. The side and back walls are tapered down and inward for appearance sake. It can also be seen that the floor of the firebox 55 forms also the top of the warming chamber 40. Because of the one-piece and solid wall construction of the firebox 5 and warming chamber 40 unit, there is excellent heat-conductivity through the floor 55 of the firebox 5 to the warming chamber 40, so that the burning coals in the firebox 5 can maintain increased temperatures in the warming chamber 40. Since the warming chamber 40 is located underneath the firebox 5, the temperature in the warming chamber 40 does not reach such a degree as to further cook the food which is on the flat plates 80. The inside temperature of the warming chamber 40 does, however, thanks to the good heat-conductivity properties of the grill's parts, become high enough to keep the prepared food hot for an extended period of time, even when the coals in the firebox 5 are barely glowing.

FIGS. 2 and 3 show how the side walls 3, 4 are attached to the firebox 5. Each narrow side 53, 54 of the firebox 5 is provided with a ledge, of which only the ledge 58 is pictured. At the front, the ledge 58 is bent to an angle 59, through which runs a threaded bore 61. Underneath, the angle 59 creates a groove 62 for the insertion of the grid 11.

At the back, the ledge is likewise bent to a right angle 63 which contains a threaded-through bore, corresponding axiswise to the through-bore 61 and running from front to back.

As is shown in FIG. 6a, each side wall 3, 4 is provided near its front edge 65 with a groove 66, running parallel with the edge 65, into which a cover 2 can be inserted at the top. On the rear edges 67 of the side walls 3, 4 runs a groove 68, parallel with the rear edge 67, into which the grease-drip pan 1 can be inserted from the top. For the purpose of greater heat-conductivity, the side walls 3, 4 are to be made of either cast iron or light die-cast metal.

The grease-drip pan, however, can be made of rust-resistant sheet steel. As FIGS. 1 and 7 indicate, another warming chamber 40', constructed of sheet steel, can be attached to the upper section of the floor 21 of the grease-drip pan 1 by riveting or welding at points X. The warming chamber 40' has a side wall section 44' on both sides. Both of these side wall sections 44' are connected by means of an inner partition 23 (see FIG. 7) which runs parallel with the edge 22 of the grease-drip pan 1. This creates an upper warming chamber 40', enclosed by the upper section of the floor 21 of the grease-drip pan, the inner partition 23, the side wall sections 44', and the back wall 24 of the upper warming chamber 40'. This upper warming chamber 40' has an opening 41' at the top for the insertion of flat plates 80 for preheating. In view of this, the depth of the upper warming chamber 40' need not be much greater than the length of a flat plate 80.

As is further shown in FIGS. 1 and 7, a lower warming chamber 40" is attached to the upper warming chamber 40' and is divided into two smaller warming chambers 38, 39. The warming chamber 38 is enclosed by the lower section of the grease-drip pan floor 21, the partition 23, the lower section of the back wall, a lower side wall 25 and a vertical inner partition 26. The flat plate opening 27 of the chamber 38 is shown in FIG. 1 on the right and is located under the side wall section 44'. Accordingly, the adjacent chamber 39 is enclosed, according to FIG. 1, on the left, by the lower left section of the grease-drip pan floor 21, the partition 23, the lower left section of the back wall 24, the lower side wall 25 and the vertical partition 26. Not pictured is the flat plate opening for this chamber 39 which is likewise located under the side wall section 44'. The space of the two chambers 38, 39 is to be so dimensioned as to allow the insertion of flat plates 80 for preheating.

As pictured in FIGS. 5a, 5b, the flat plate, as seen from above, is quadrilateral in shape with a low, surrounding lip 81. The height of the lip 81 is so determined so as not to prevent the flat plate 80, which is holding food, from entering through the openings of the warming chambers 40, 40'. One side of the flat plate 80 is widened into a handle section 82 and is provided with two blind holes 84, 85, which run parallel to the floor 83 of the flat plate 80. A fork 86 is inserted into these holes with a small degree of play, the handle 87 of which is made of some heat-insulating material, such as wood. To handle the plates, the fork 86 is inserted into the blind holes 84, 85 by means of the handle 87. The tines 88 of the fork 86 are slightly bent to an angle at point 89. Digressing from the pictured example, the flat plate 80 could be fitted with handle sections on each of the four sides; also, it would be possible to make the base of the flat plate so sturdy that blind holes 84, 85 could be bored into the sides for the insertion of the fork tines 88. In doing this, the effective portability of the flate plates could be improved.

The warming chamber 40 is connected to the legs 70–73 by means of a pair of pivot joints. Each pivot joint consists of a stub-shaft 15 which is bolted onto a reinforcement plate 90 on the side of the firebox 5. As shown in FIG. 2a, the stub-shaft is provided on the remote end with a stop-arm 91. The stub-shaft 15 and the stop-arm 91 are a one-piece unit. The stop-arm 91 has a width equal to the diameter of the stub-shaft 15 and extends toward the back of the firebox 5 running parallel with the floor 55 of the firebox 5. The stop-arm features both an upper 92 and a lower stop-face 16. For good stability, the stub-shaft 15 is located approximately in the middle of the rear half of the side wall 53, 54 and is bolted onto a reinforcement bar 90 under the floor 55 of the firebox 5.

To receive the stub-shaft 15, a U-shaped cradle 93 is formed by a reinforcing rim 94 on the cradle housing 7. This cradle housing 7 has an essentially trapezoidal shape and is made of heavy-duty light die-cast metal. The cradle 93 extends downward from the short upper edge of the cradle housing 7 so that the upper surface of the stub-shaft, when resting in the cradle 93, is of the same height as, or slightly under, the surface 95 of the striker-plate 96, which is parallel to the base of the trapezoid. Also on the cradle housing 7 is a wider striker-plate 79 which is formed by an enlargement of the reinforcing rim 94. The striker-plate 79 features a stop-face 78, which corresponds to, and is at a right angle to, the stop-face 95 of striker-plate 96. The section of the rim 94 over which the stop-arm 91 rides is not as strong as the other sections of the rim on the cradle housing 7 (see FIG. 8).

On each of the lower corners of the cradle housing 7 is a socket 74, 75, in each of which is a blind hole into which is inserted one of the legs 70–73. Moreover, through the socket that does not connect to the striker-plate 96 there is a through-bore, located below and to the front of the cradle 93. Through this bore 77 is inserted a long bolt which is screwed into the open end of the tie rod 76.

On the front side 51 of the firebox 5, in the vicinity of each sidewall 3, 4, are threaded holes 31, 32 into which can be screwed handles 50 made of some heat-insulating material, such as wood.

To set up the grill 30, the legs 70–73, each provided with a skid-proof cup 23, are inserted into the sockets 74, 75 and fastened with a pin. The cradle housings 7, fitted with the legs, are then connected to each other by means of the tie rod 76 through the insertion of a bolt through the bore 77.

The one-piece warming chamber 40 and firebox 5 unit is then placed vertically upon the cradle housings 7 so that each stub-shaft 15 rests in the cradles 93 and so that the lower stop-face 16 of the stop-arm 91 rests upon the stop-face 78 of the striker plate 79. The firebox 5 can then be tilted to a 90° position so that the upper stop-face 92 of the stop-arm 91 rests upon the striker plate 96.

At this point, the side walls 3, 4 can be attached by means of set screws (not pictured) which are inserted into the threaded holes 61, 64 until they enter the blind holes 34, 35 on the lower edge of each of the sidewalls 3, 4. An outward-pointing foot 36 at the bottom of each of the side walls 3, 4 prevents the side walls 3, 4 from slipping outward when placed upon the upper ridge of the narrow walls 53, 54 of the firebox 5. Then, the grease-drip pan 1 is inserted from above into the grooves 68 until its bottom edge 22 goes behind the ridge 56. The grid 11 can then be shoved into the grooves 62. The spit bar 12 with its handle 14 is inserted into the holding notches 97 and the grill is ready for use.

The grill can now be safely tilted from a horizontal to a vertical position by grasping the handles 50 which are screwed into the holes 31, 32. The tilt positions are determined by the respective relationships of stop-faces 95 and 78 in conjunction with stop-faces 92 and 16.

The invention is not limited to the details described in this presentation. It is also within the scope of this invention to provide for the attachment of only one warming chamber, either under the floor of the firebox, behind the back wall of the grease-drip pan, or else on the outer sides of the side walls 3, 4. Moreover, the partition 26 can be dispensed with, creating a warming chamber 40" that features two facing flat plate openings. Finally, the invention can be applied to grills in which the firebox, the side walls 3, 4 and the grease-drip pan are of one-unit construction and can even be developed into round shape.

Having described our invention, we claim:

1. A grill having a front and a rear, said grill comprising
  a cast firebox having a bottom wall and upwardly extending side walls;
  a grid extending in a horizontal plane between said upwardly extending side walls;
  a grease-drip pan extending vertically upwardly between the rear edges of said side walls;
  a shallow warming chamber disposed beneath said firebox, said warming chamber including side walls and a bottom wall in heat-conducting relationship with said firebox, the bottom wall of said firebox forming the top wall of said warming chamber;
  said warming chamber including an opening at the front portion of said grill to allow the insertion of at least one heat-conducting flat plate for heating and warming;
  legs for supporting said grill;
  means interconnecting said legs and said grill for supporting said firebox in a horizontal plane and in a vertical plane;
  said warming chamber opening being disposed upwardly when said firebox is in said vertical plane.

2. The grill device of claim 1 in which said grease-drip pan further includes an auxiliary warming chamber adapted to receive a heat-conducting flat-plate.

3. The grill device of claim 1 in which said grease-drip pan includes a back wall facing said firebox and said warming chamber is disposed rearwardly of said back wall.

4. The grill device of claim 3 in which said auxiliary warming chamber includes a wall parallel to, and spaced from, said back wall.

5. A grill comprising,
  a firebox, said firebox including a base and two upwardly extending sides;
  two side walls extending above said sides, said side walls having means for supporting a spit bar mounted between the side walls;
  a grease-drip pan mounted upon the rear of said firebox and extending upwardly between the rear vertical edges of the side walls;
  a grid;
  means mounting said grid on said firebox;
  first and second sets of legs;
  means mounting said firebox upon said legs, whereby said firebox is tiltable from a first position in which the base of the firebox is essentially horizontal to a second position in which the base of the firebox is essentially vertical, said means comprising
  a stub shaft attached to each of said sides;
  a pair of cradles, one cradle being carried by each set of legs, each of said cradles receiving and supporting one of said stub shafts;
  a tie bar extending between said cradles;
  means spaced from the upper edge of said cradle for securing said tie bar to each said cradle.

6. The grill device of claim 5 in which each of said cradles includes two striker plates effective to engage said stub-shaft for limiting movements of said firebox.

7. The grill device of claim 6 in which each said stub-shaft carries a stop arm, said stop arm having a lower and an upper stop-face.

8. The grill device of claim 5 in which each of said cradles includes a peripheral rim, two striker plates forming part of said rim, each of said striker plates having a stop-face, said faces being diametrically opposite, and at right angles to, one another.

9. The grill device of claim 5 in which the lower ends of each of the cradles carry two sockets receiving said legs.

10. The grill device of claim 5 further including a tie rod, one of said sockets in each cradle including a bore for receiving said tie rod.

11. The grill device of claim 5 in which said cradle includes a U-shaped recess extending downwardly from the upper edge of said cradle.

12. The grill device of claim 11 in which said fastening means includes a through-bore in the cradle located below and spaced from the U-shaped opening.

* * * * *